United States Patent [19]

Fuchigami et al.

[11] Patent Number: 5,044,333
[45] Date of Patent: Sep. 3, 1991

[54] BALANCING ARRANGEMENT FOR INTERNAL COMBUSTION ENGINE

[75] Inventors: Wataru Fuchigami; Yoji Utsumi, both of Iwata, Japan

[73] Assignee: Yamaha Hatsudoki Kabushiki Kaisha, Iwata, Japan

[21] Appl. No.: 532,203

[22] Filed: Jun. 1, 1990

[30] Foreign Application Priority Data

Jun. 5, 1989 [JP] Japan .................................. 1-141095

[51] Int. Cl.⁵ ............................................ F02B 75/06
[52] U.S. Cl. .................................. 123/192 B; 74/604
[58] Field of Search ......................... 123/192 B, 90.31; 74/603, 604, 409, 574

[56] References Cited

U.S. PATENT DOCUMENTS 4,300,493 11/1981 Berti ................................ 123/192 B

FOREIGN PATENT DOCUMENTS

| 47-5005 | 2/1972 | Japan . |
| 49-43737 | 11/1974 | Japan . |
| 60-78133 | 5/1985 | Japan . |
| 61-46180 | 12/1986 | Japan . |
| 64-8220 | 2/1989 | Japan . |
| 844071 | 8/1960 | United Kingdom ............ 123/192 B |

Primary Examiner—Noah P. Kamen
Attorney, Agent, or Firm—Ernest A. Beutler

[57] ABSTRACT

A balancer arrangement for a two cylinder in-line internal combustion engine that includes a drive gear formed on the crankshaft between a pair of throws and between a pair of bearing surfaces. A pair of balance shafts are driven from this drive gear and have inertial masses coupled to them through a torsional vibration damper. The inertial masses are disposed between the adjacent pair of cylinders and within the crankcase so as to provide a compact engine.

17 Claims, 3 Drawing Sheets

BALANCING ARRANGEMENT FOR INTERNAL COMBUSTION ENGINE

BACKGROUND OF THE INVENTION

This invention relates to a balancing arrangement for an internal combustion engine and more particularly to an improved, compact and yet efficient engine balancing arrangement.

As is well known, reciprocating engines provide a number of forces that can give rise to vibration. By appropriately positioning the cylinders and firing order, some of these forces can be balanced However, in certain types of engines and engines having certain numbers of cylinders, not all of the forces can be inherently balanced by the cylinder placement and firing order.

One method of balancing engines and these forces which are not capable of being balanced due to the inherent design of the engine itself employs the use of one or more balancing shafts that contain inertial weights and which are driven by the engine crankshaft. However, for the most part, these prior art constructions have added considerably to the bulk of the engine and also have been difficult to properly position. The location of the axes of rotation of the balance masses has been on a plane that is inclined to the mating plane of the crankcase halves and thus, has put added stress on the crankcase bolts requiring larger, heavier and more expensive bolts.

It is, therefore, a principal object of this invention to provide an improved balancing shaft arrangement for an internal combustion engine wherein the forces on the engine can be easily balanced, vibrations avoided and the engine still maintains a compact assembly.

It is a further object of this invention to provide an improved and simplified balancing shaft arrangement for an internal combustion engine.

It is yet another object of this invention to provide an arrangement for driving a balancing shaft from the engine output shaft and maintaining a compact engine construction.

SUMMARY OF THE INVENTION

This invention is adapted to be embodied in a balancing shaft arrangement for an internal combustion engine that has a pair of aligned adjacent bores. A crankshaft is journalled for rotation about an axis at an end of the cylinder bores and has a pair of adjacent throws. A drive gear is formed on the crankshaft between the throws and a pair of balancer shafts are driven by this drive gear and are rotatable about axis parallel to the crankshaft axis. Eccentric inertial masses are affixed for rotation with each of the balanced shafts and are located axially between the adjacent cylinder bores.

DETAILED DESCRIPTION OF THE PREFERRED EMBODIMENT OF THE INVENTION

Figure 1:
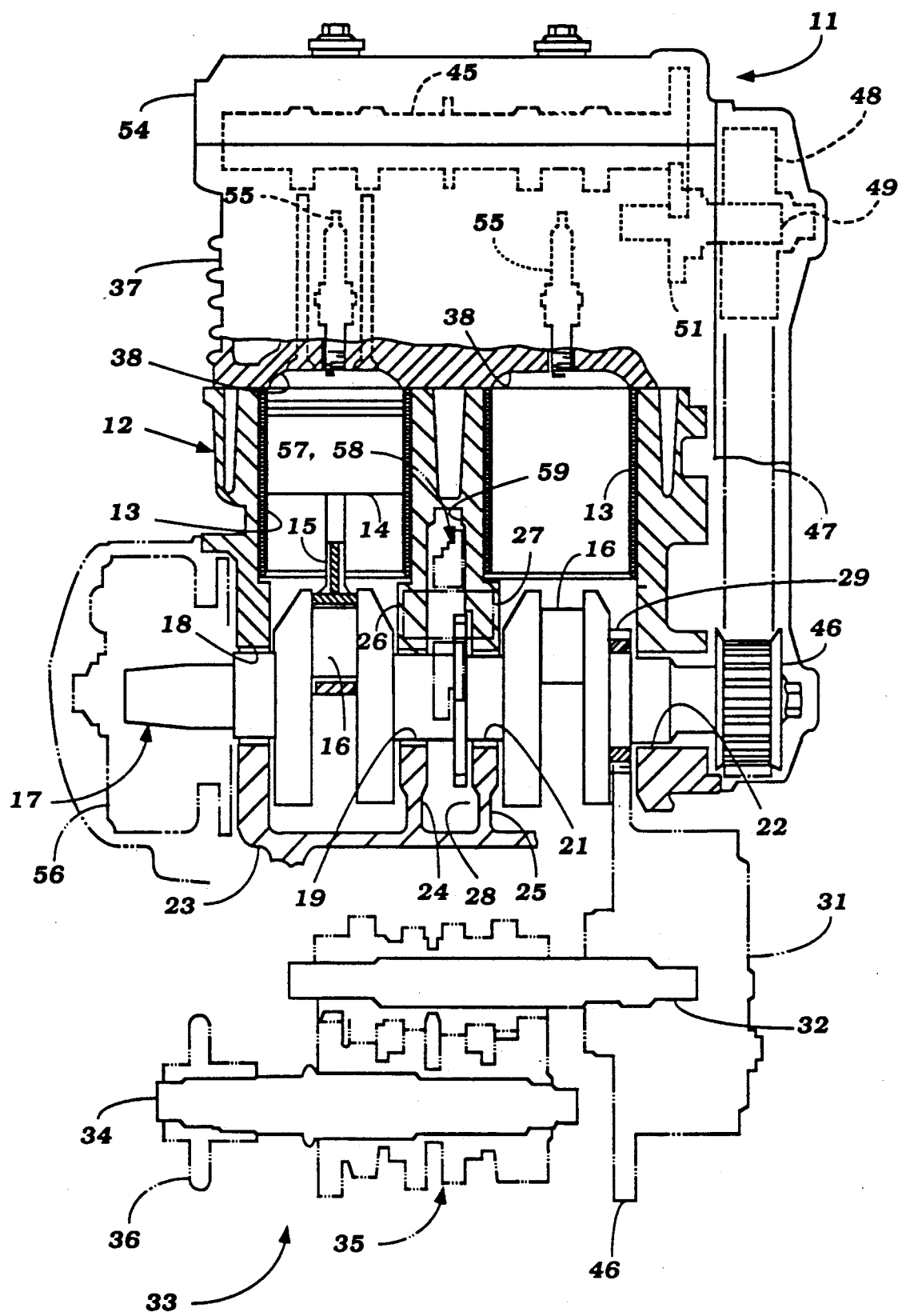
FIG. 1 is a side elevational view of an engine transmission assembly for a vehicle, with a portion broken away and other portions shown in phantom.
Figure 2:
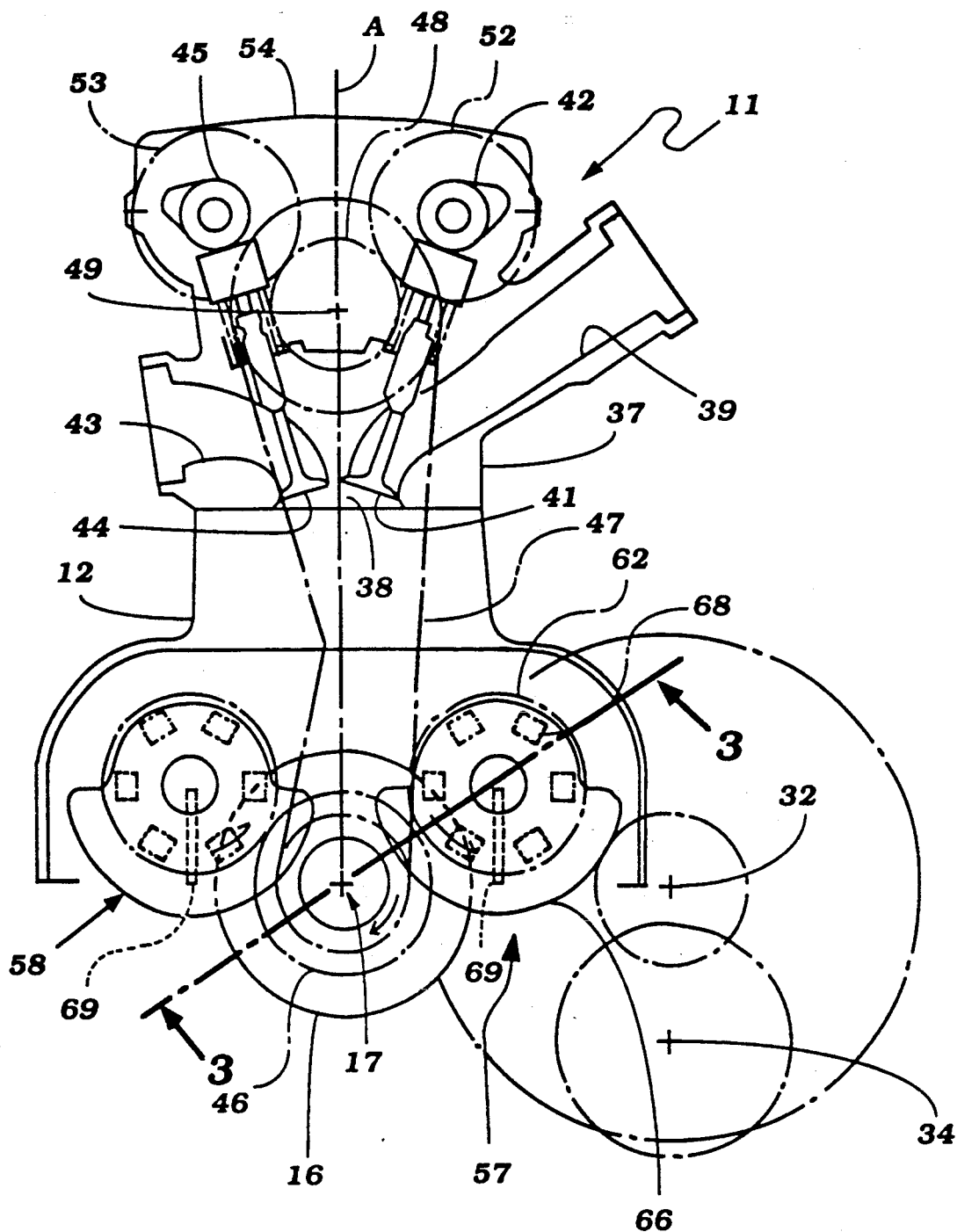
FIG. 2 is an end elevational view of the engine, with portions broken away and shown in section.

In the drawings the reference numeral 11 indicates generally a two cylinder in-line internal combustion engine constructed in accordance with an embodiment of the invention. Although the invention is depicted in conjunction with a two-cylinder engine it is to be understood that certain facets of the invention may be utilized in conjunction with engines having other cylinder numbers. However, the invention has particular utility with such a two cylinder in-line engine and one operating on the four-stroke principal.

The engine 11 includes a cylinder block 12 that has a pair of cylinder bores formed by adjacent cylinder liners 13. Pistons 14 reciprocate in these cylinder bores and are connected by means of connecting rods 15 to adjacent throws 16 of a crankshaft, indicated generally by the reference numeral 17. The crankshaft 17 is journalled by means of a plurality of axially spaced bearings 18, 19, 21 and 22 that are fixed between the cylinder block 12 and a crankcase 23 that is affixed to the cylinder block in a known manner. The crankcase 23 has a pair of bearing portions 24 and 25 that cooperate with the bearings 19 and 21 and webs 26 and 27 of the cylinder block so as to support these bearings. Alternatively, separate bearing caps may be employed but the disclosed construction permits ease of assembly and a relatively simple construction. It should be noted that the webs 24 and 25 define a recessed area 28 between them in the crankcase which will serve a purpose to be described.

An output gear 29 is affixed to the crankshaft 17 adjacent the forward end of the throw 16 and drives a clutch assembly 31. The clutch assembly is adapted to transmit drive to a primary or input shaft 32 of a change speed transmission, indicated generally at 33. This transmission further includes a secondary shaft 34 and a plurality of intermeshing gear sets 35 that can be selectively coupled to the shafts 32 and 34 through an appropriate shift mechanism for driving the secondary shaft 34 from the primary shaft 32 at selected speed ratios. A sprocket 36 is affixed to the secondary shaft and is adapted to be coupled to the wheel or wheels of an associated vehicle (not shown) for driving the vehicle in a known manner.

A cylinder head 37 is affixed to the cylinder block 12 in a known manner and has recesses 38 that cooperate with the cylinder bores formed by the liners 13 and the heads of the pistons 14 to form the combustion chambers. The cylinder head 37 is provided with intake ports 39 that communicate the combustion chambers with an intake system including a charge forming device (not shown). Intake valves 41 control the communication of the intake passages 39 with the combustion chambers 37 and are operated by means of an intake camshaft 42 that is journalled in the cylinder head 37.

In a similar manner, exhaust passages 43 extend through the opposite side of the cylinder head 37 and communicate with an exhaust manifold (not shown) for discharging the exhaust gases to the atmosphere. Exhaust valves 44 are slidably supported within the cylinder head 37 and are operated by means of an exhaust camshaft 45 for operating the exhaust valves 44 in a known manner.

A drive sprocket 46 is affixed to the forward end of the crankshaft 17 in an appropriate manner and drives a tooth timing belt 47 which, in turn, drives a sprocket 48 that is journalled on the cylinder head 37 by means of a shaft 49. This shaft 49, in turn, carries a drive gear 51 which is enmeshed with a pair of timing gears 52 and 53 that are affixed to the intake and exhaust camshafts 42 and 45 for driving them. A cam cover 54 is affixed to the cylinder head assembly and encloses this cam mechanism.

Spark plugs 55 are mounted in the cylinder head and are fired by an ignition system including a magneto generator 56 that is driven off the end of the engine crankshaft 17 opposite the sprocket 46.

Figure 3:
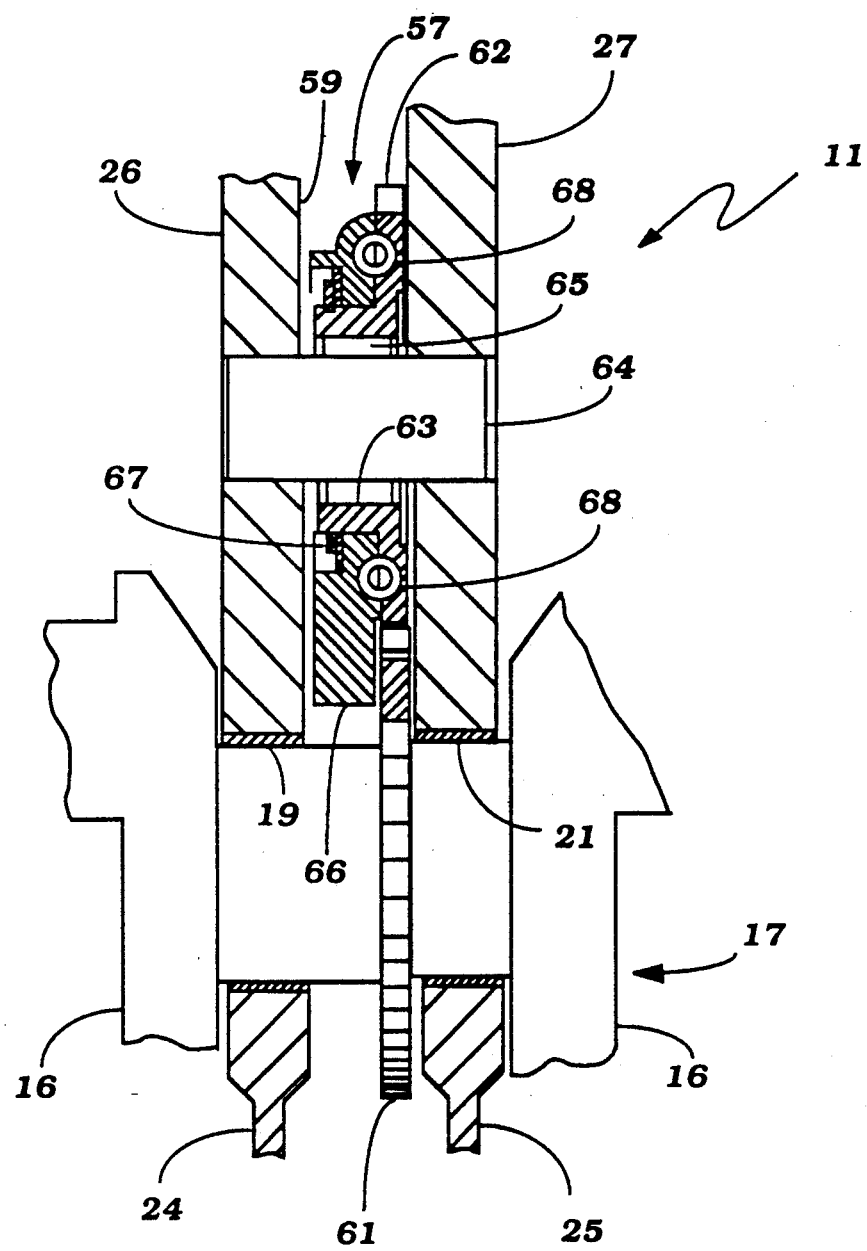
FIG. 3 is an enlarged cross sectional view taken along the line 3—3 of FIG. 2 and shows one of the balancing shafts and its construction and the manner in which it is driven.

As is well known, a two cylinder in-line type of engine has certain forces that cannot be fully balanced merely by counterweighting the crankshaft. Therefore, in order to balance all of the forces on the engine, there are provided a pair of balancers, indicated generally by the reference numerals 57 and 58 which are driven from the crankshaft 17 at crankshaft speed. In accordance with the invention, the balancers 57 and 58 are located in a recess 59 formed in the cylinder block 12 between the webs 26 and 27. This provides a very compact and neat assembly and does not significantly add to the length or bulk of the engine. Each balancer 57 and 58 is the same in construction and is driven from a drive gear 61 that is either affixed to or formed integrally with the crankshaft 17 between the throws 16 and between the bearings 19 and 21 in the recess 28 as clearly shown in FIG. 3. This drive gear 61 is immeshed with a driven gear 62 of the balancer assembly 57 and 58 and which is formed on an integral hub portion 63 which is journalled for rotation on a balancer shaft 64 by means of an anti-friction bearing 65. An eccentric balancer mass 66 is axially fixed on this hub portion 63 by means including a snap ring 67 and it is rotatably coupled to the drive gear 62 by means of a plurality of torsional springs 68 that are received in pockets formed at circumferentially spaced locations around the drive gear 62 and the inertial mass 66. As a result, the torsional spring 68 will also provide some torsional vibration damping for the engine. Pins 69 hold the shafts 64 in their position.

With many applications the cylinder axis is inclined to the vertical when installed in a vehicle such as a motorcycle. With prior art constructions this has meant that the crankscase is split at an angle to the plane containing the axes of the balance means. This gives a tensil face on the crankcase both which must be resisted by larger, heavier and more costly bolts. The synthetic positioning of the axes in this invention is a plane parallel to the plane of the crankshaft halves avoids these problems.

It should be readily apparent that the described construction permits a very compact engine and yet one in which the vibrations can be easily dampened without significantly adding to either the volume or complexity of the engine. Although a preferred embodiment of the invention has been illustrated and described, various changes and modifications may be made without departing from the spirit and scope of the invention, as defined by the appended claims.

We claim:

1. A balancing shaft arrangement for an internal combustion engine having a pair of aligned, adjacent cylinder bores, a crankshaft journalled for rotation about an axis at one end of said cylinder bores and having a pair of adjacent throws, a drive gear formed on said crankshaft between said throws, a pair of balancer shafts rotatably journalled about axes parallel to said crankshaft axis and driven by said drive gear, and a pair of eccentrial inertial masses each affixed for rotation with a respective one of said balance shaft and located in the area between said adjacent cylinder bores.

2. A balancing shaft arrangement for an internal combustion engine as set forth in claim 1 wherein the crankshaft is formed with a pair of spaced bearing surfaces on opposite sides of the drive gear and the inertial masses are disposed between portions of the engine journalling said spaced bearing surfaces.

3. A balancing shaft arrangement for an internal combustion engine as set forth in claim 1 further including torsional damping means for rotatably coupling the inertial masses to the balance shafts.

4. A balancing shaft arrangement for an internal combustion engine as set forth in claim 3 wherein the balance shafts are formed with a gear portion engaged with the crankshaft drive gear and a hub portion journalling the inertial masses.

5. A balancing shaft arrangement for an internal combustion engine as set forth in claim 4 wherein the crankshaft is formed with a pair of spaced bearing surfaces on opposite sides of the drive gear and the inertial masses are disposed between portions of the engine journalling said spaced bearing surfaces.

6. A balancing shaft arrangement for an internal combustion engine as set forth in claim 1 wherein the inertial masses are positioned in part in the engine crankcase.

7. A balancing shaft arrangement for an internal combustion engine as set forth in claim 6 wherein the crankshaft is formed with a pair of spaced bearing surfaces on opposite sides of the drive gear and the inertial masses are disposed between portions of the engine journalling said spaced bearing surfaces 8. A balancing shaft arrangement for an internal combustion engine as set forth in claim 6 further including torsional damping means for rotatably coupling the inertial masses to the balance shafts.

9. A balancing shaft arrangement for an internal combustion engine as set forth in claim 8 wherein the balance shafts are formed with a gear portion engaged with the crankshaft drive gear and a hub portion journalling the inertial masses.

10. A balancing shaft arrangement for an internal combustion engine as set forth in claim 9 wherein the crankshaft is formed with a pair of spaced bearing surfaces on opposite sides of the drive gear and the inertial masses are disposed between portions of the engine journalling said spaced bearing surfaces.

11. A balancing shaft arrangement for an internal combustion engine having a pair of aligned, adjacent cylinder bores, a crankshaft journalled for rotation about an axis at one end of said cylinder bores and having a pair of adjacent throws, a drive gear formed on said crankshaft between said throws, said crankshaft being formed with a pair of spaced bearing surfaces on opposite sides of said drive gear, a pair of balancer shafts rotatably journalled about axes parallel to said crankshaft axis and driven by said drive gear, and a pair of eccentrial inertial masses each affixed for rotation with a respective one of said balance shafts and located between portions of said engine journalling said spaced bearing surfaces.

12. A balancing shaft arrangement for an internal combustion engine as set forth in claim 11 wherein the inertial masses are positioned in part in the engine crankcase.

13. A balancing shaft arrangement for an internal combustion engine as set forth in claim 12 further including torsional damping means for rotatably coupling the inertial masses to the balance shafts.

14. A balancing shaft arrangement for an internal combustion engine as set forth in claim 13 wherein the balance shafts are formed with a gear portion engaged with the crankshaft drive gear and a hub portion journalling the inertial masses.

15. A balancing shaft arrangement for an internal combustion engine having a pair of aligned, adjacent cylinder bores, a crankshaft journalled for rotation about at axis at one end of said cylinder bores and having a pair of adjacent throws, a drive gear formed on said crankshaft between said throws, a pair of balancer shafts rotatably journalled about axes parallel to said crankshaft axis and driven by said drive gear, and a pair of eccentrial inertial masses each affixed for rotation by torsional damping means with a respective one of said balance shafts.

16. A balancing shaft arrangement for an internal combustion engine as set forth in claim 15 wherein the balance shafts are formed with a gear portion engaged with the crankshaft drive gear and a hub portion journalling the inertial masses.

17. A balancing shaft arrangement for an internal combustion engine as set forth in claim 16 wherein the crankshaft is formed with a pair of spaced bearing surfaces on opposite sides of the drive gear and the inertial masses are disposed between portions of the engine journalling said spaced bearing surfaces.

* * * * *